United States Patent [19]

Duncan

[11] 3,859,811

[45] Jan. 14, 1975

[54] DEWAXING OF A HYDROCARBON FEEDSTOCK BY DIRECT CONTACT WITH A REFRIGERANT

[75] Inventor: Allan George Duncan, Harwell, England

[73] Assignee: United Kingdom Atomic Energy Authority, London, England

[22] Filed: May 30, 1972

[21] Appl. No.: 257,807

[52] U.S. Cl. ................................................. 62/58
[51] Int. Cl. ............................................ B01d 9/04
[58] Field of Search ........................................ 62/58

[56] References Cited
UNITED STATES PATENTS

| | | | |
|---|---|---|---|
| 1,456,953 | 5/1923 | Groeling | 62/58 |
| 2,031,118 | 2/1936 | Merrill | 62/58 |
| 2,078,992 | 5/1937 | Banks | 62/58 |
| 2,085,521 | 6/1937 | Anderson | 62/58 |
| 2,296,417 | 9/1942 | Bays | 62/58 |
| 2,996,894 | /1961 | shade | 62/58 |
| 3,224,212 | 12/1965 | Engdahl | 62/58 |
| 3,271,163 | 9/1966 | Malick | 62/58 |
| 3,305,320 | 2/1967 | Weech | 62/58 |
| 3,513,212 | 5/1970 | Skrebowski | 62/58 |
| 3,643,453 | 2/1972 | Grouthuis | 62/58 |

*Primary Examiner*—A. Louis Monacell
*Assistant Examiner*—Frank Sever
*Attorney, Agent, or Firm*—Larson, Taylor & Hinds

[57] ABSTRACT

Refrigeration apparatus is disclosed in which a feed stock containing two components to be separated by refrigeration is fed to a vessel. Mounted in the vessel out of contact with the feed stock is a heat exchanger. When a direct contact refrigerant is added to the vessel it is cyclically evaporated from the feed stock and condensed for return to the feed stock by the heat exchanger. Continued evaporation of the refrigerant lowers the temperature of one component of the feed stock sufficiently to cause it to crystallise. The apparatus and process are particularly useful in the dewaxing of lubricating and other oils.

11 Claims, 2 Drawing Figures

DEWAXING OF A HYDROCARBON FEEDSTOCK BY DIRECT CONTACT WITH A REFRIGERANT

The invention relates to refrigeration methods and apparatus.

The invention provides refrigeration apparatus for separating a component compound from a feed-stock by crystallization, comprising a vessel for holding a mixture of the feed-stock and a refrigerant whose liquefaction temperature at a predetermined pressure is at least as low as the temperature at which the component compound crystallize from the mixture at the predetermined pressure, a heat exchanger mounted in the vessel to be clear of the mixture in use, and means for cooling said heat exchanger down to at least the liquefaction temperature of the refrigerant whereby to liquefy the refrigerant evaporating from the mixture and return the refrigerant to the mixture and thereby promote crystallization of the component compound.

According to the invention, there is further provided a method of separating a component compound from a feed-stock by crystallization of the component compound from the feed-stock, comprising the steps of mixing a refrigerant with the feed-stock, so as to cause cooling of the feed-stock through evaporation of the refrigerant, liquefying the evaporated refrigerant and returning the refrigerant to the feed-stock so that the feed-stock cools to that temperature at which crystallization of the component compound occurs, and removing the crystallized component compound from the mixture of feed-stock and refrigerant.

The present invention further provides a continuous oil dewaxing process, comprising the steps of mixing oil with an oil-miscible refrigerant, allowing the refrigerant to evaporate to chill the mixture sufficiently to induce crystallization of the wax in the oil, condensing the evaporated refrigerant and rturning it to the mixture, separating the crystallized wax from the mixture, and processing the remainder of the mixture to separate the dewaxed oil and the refrigerant.

The present invention still further provides refrigeration apparatus, comprising a refrigerator plant having a condenser, a crystallizer mounted below and in communication with the condenser, means for feeding a mixture of oil to be dewaxed and a direct contact refrigerant to the crystallizer, refrigeration means coupled to the condenser for cooling the condenser to continuously condense vaporised refrigerant from the crystalliser and to return it to the crystallizer thereby chilling the oil and promoting crystallisation of the wax a separator means interconnecting the crystallizer and the separator for drawing off the crystallized wax. dewaxed oil, and refrigerant from the crystallizer and feeding it to the separator for separation of the crystallized wax from the remainder, means for discharging the separated wax, and means coupled to the separator for separating the remaining dewaxed oil and refrigerant.

Refrigeration apparatus embodying the invention, and a refrigeration method according to the invention will now be described, by way of example, with reference to the diagrammatic drawings, in which.

Figure 1:
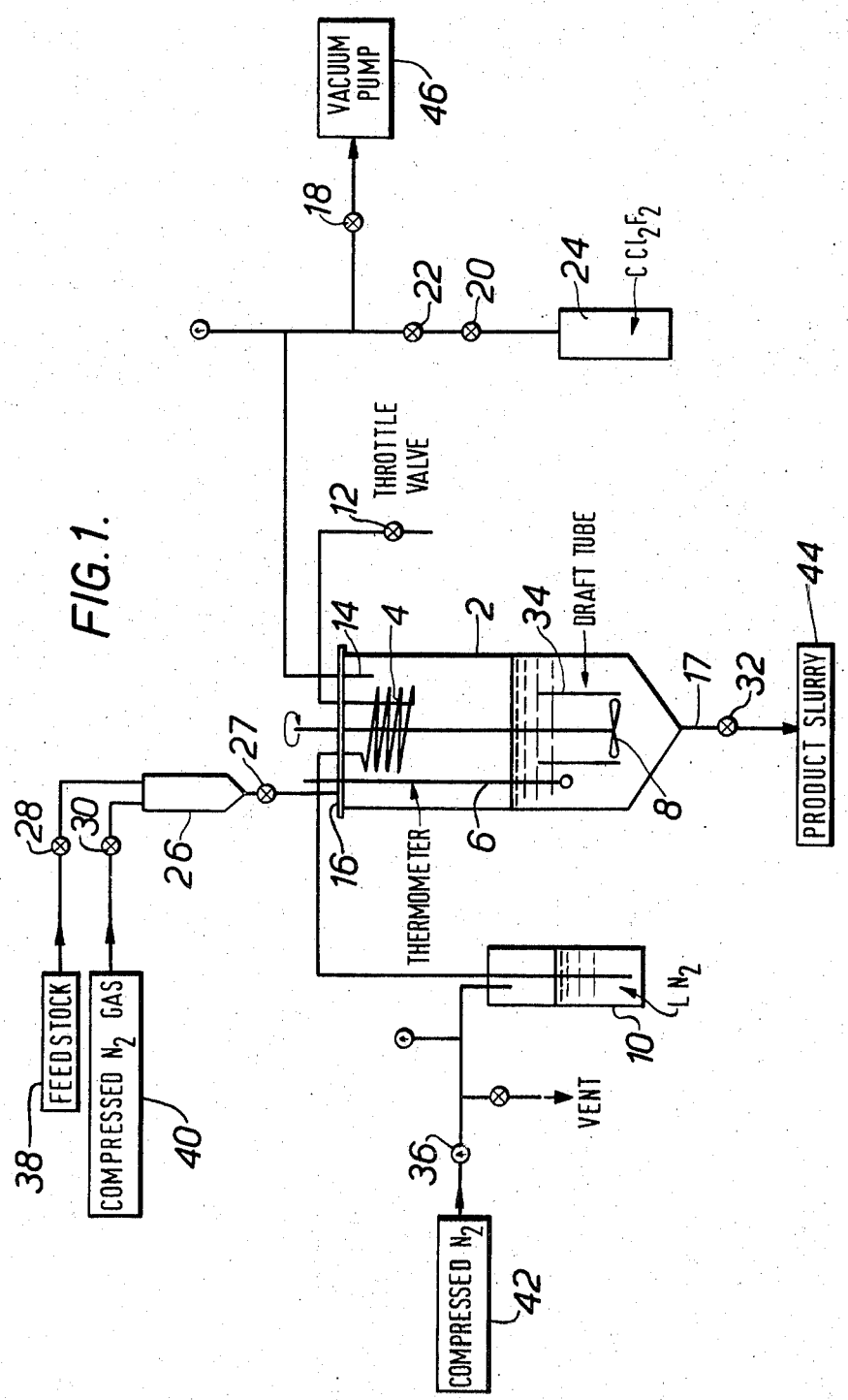
FIG. 1 is a side elevation of the refrigeration apparatus.

The apparatus and method to be described in conjunction with FIG. 1 are for crystallizing para-xylene from a feed-stock in which it is in solution with meta-xylene, though are not limited to this application. For example the apparatus can be used for separating saturated and unsaturated fatty acids, or crystallizing acetic acid from a mixture of acetic acid and acetic anhydride.

As shown in FIG. 1, a sealed vessel 2 contains a heat exchanger 4, a thermometer 6 and a stirrer 8. The heat exchanger 4 comprises a coil of copper tubing which is fed at one end with liquid nitrogen from a container 10. The other end of the tubing is connected to a throttle valve 12 which allows the liquid nitrogen to escape from the coil into the atmosphere.

The vessel 2 has two inlets 14 and 16 and an outlet 17. The vessel 2 can be evacuated through the inlet 14 via a valve 18 by means of a vacuum pump 46, or supplied at the inlet 14 with a refrigerant (for example $CCl_2F_2$) from a container 24 through a valve 20 and a pressure regulator 22. Feed-stock from a container 26 can be forced by compressed refrigerant gas into the vessel 2 via a valve 27 and through the inlet 16. The feed-stock and compressed refrigerant gas is fed into the container 26 from a feed-stock reservoir 38 and a gas cylinder 40 through respective valves 28 and 30.

A valve 32 regulates the flow of material from the outlet 17 to a product slurry sump 44. A draft tube 34 is provided to assist the circulation of the contents of the vessel under the action of the stirrer 8.

Compressed nitrogen gas in a cylinder 42 is fed to the container 10 through a valve 36 to force liquid nitrogen through the heat exchanger 4.

The operation will now be explained.

Let it be assumed that the valves 18, 20, 27, 28, 30, 32 and 36 are closed, that the vessel 2 is empty and that the container 26 is filled with a feed-stock in the form of a solution of 85% by volume of para-xylene in meta-xylene. The temperature of the feed-stock is approximately 7°C.

When the valves 30 and 27 are opened, feed-stock is forced into the vessel 2 to a level below the heat exchanger 4 whereupon the valve 27 is closed. The stirrer 8 is then activated to stir the feed-stock, and the valve 18 opened to evacuate gas from the vessel and degas the feed-stock.

Thereafter, the valve 18 is closed and the valve 20 opened to allow the refrigerant $CCl_2F_2$ to enter the vessel 2 under pressure. The pressure regulating valve 22 is adjusted to maintain the pressure inside the vessel at about 2 to 3 pounds per square inch. At the same time the valve 36 is opened to allow nitrogen gas to force liquid nitrogen from the container 10 through the heat exchanger 4. The throttle valve 12 is adjusted to maintain the liquid nitrogen under a pressure of approximately 5 pounds per square inch. The gaseous refrigerant adjacent the heat exchanger then begins to liquefy and fall into the feed-stock. The liquefied refrigerant, which is mixed with the feed-stock under the action of the stirrer, begins to vaporise from the mixture and to cause the mixture to cool to a temperature of −5°C. At this temperature, crystallization of the para-xylene from the mixture takes place since the para-xylene is supersaturated as a result of a drop in its solubility caused by the drop in temperature. At this point the saturation concentration of the refrigerant in the mixture is about 10% by volume and the valve 20 is closed to allow the concentration to remain at this level. Thereafter, the operating temperature inside the vessel 2 is controlled by adjusting the flow of liquid nitrogen through the throttle valve 12 so that the pressure in the vessel is maintained at 1 to 2 pounds per square inch. Under these conditions the refrigerant is vaporised from the mixture, recondensed on the heat exchanger and returned to the mixture in a continuous cycle. As the process progresses, a slurry containing para-xylene crystals forms at the bottom of the vessel and a partial size classification of the crystal product takes place with the larger crystals lying below the smaller crystals.

At regular intervals the valve 32 is opened to draw off a portion of the slurry from the bottom of the vessel 2. The drawn off slurry is left at atmospheric pressure and increases in density due to the vaporisation of superfluous refrigerant. If the slurry is subjected to subatmospheric pressure, a further increase in density occurs.

The crystal product is then separated from the mother liquor by filtration and washing down to leave 99% pure para-xylene.

Each time that a quantity of slurry is removed from the vessel the valves 26 and 20 are opened for a sufficient period to allow the lost feed-stock and refrigerant to be replenished.

Over a period of time, inert gases originally dissolved in the feed-stock will accumulate in the vessel and the vessel will have to be occasionally purged to remove these gases.

It will be appreciaed by persons skilled in the art that crystallization of the para-xylene can be achieved in the apparatus described using different relative values of the parameters of pressure, temperature, ratio of refrigerant to feed-stock and composition of feed-stock. For example a continuous separation of para-xylene has been achieved by operating the apparatus in a modified manner and using a feed-stock which has been pre-cooled to −35°C and contains approximately 20%k by weight of para-xylene in meta-xylene; a crystallizing temperature of −65°C to −70°C using the fluorocarbon $CClF_3$ as refrigerant and a pressure of one atmosphere. Under such conditions the solubility of the feed-stock in the mother liquor is about 5% by weight and a para-ylene purity of 99.6% has been achieved.

It will be appreciated that since the solid phase of refrigerants $CClF_3$ and $CCl_2F_2$ occurs at temperatures lower than −100°C, the problem of the refrigerant going into solid phase during the crystallizing cycle need not be encountered.

Other refrigerants such as ethane and ethylene can also be used.

Instead of the heat-exchanger comprising a copper coil it can take the form of an extended surface heat-exchanger which is cooled by a conventional refrigeration cycle using a working fluid such as ethylene.

The advantages of the apparatus include the elimination of the need for refrigerant purification equipment, greater flexibility in choice of operating conditions resulting from the separation of working fluid in the external cycle from the direct contact refrigerant and minimisation of the dissolved direct contact refrigerant consistent with acceptable driving forces for vaporisation and condensation of the direct refrigerant.

Figure 2:
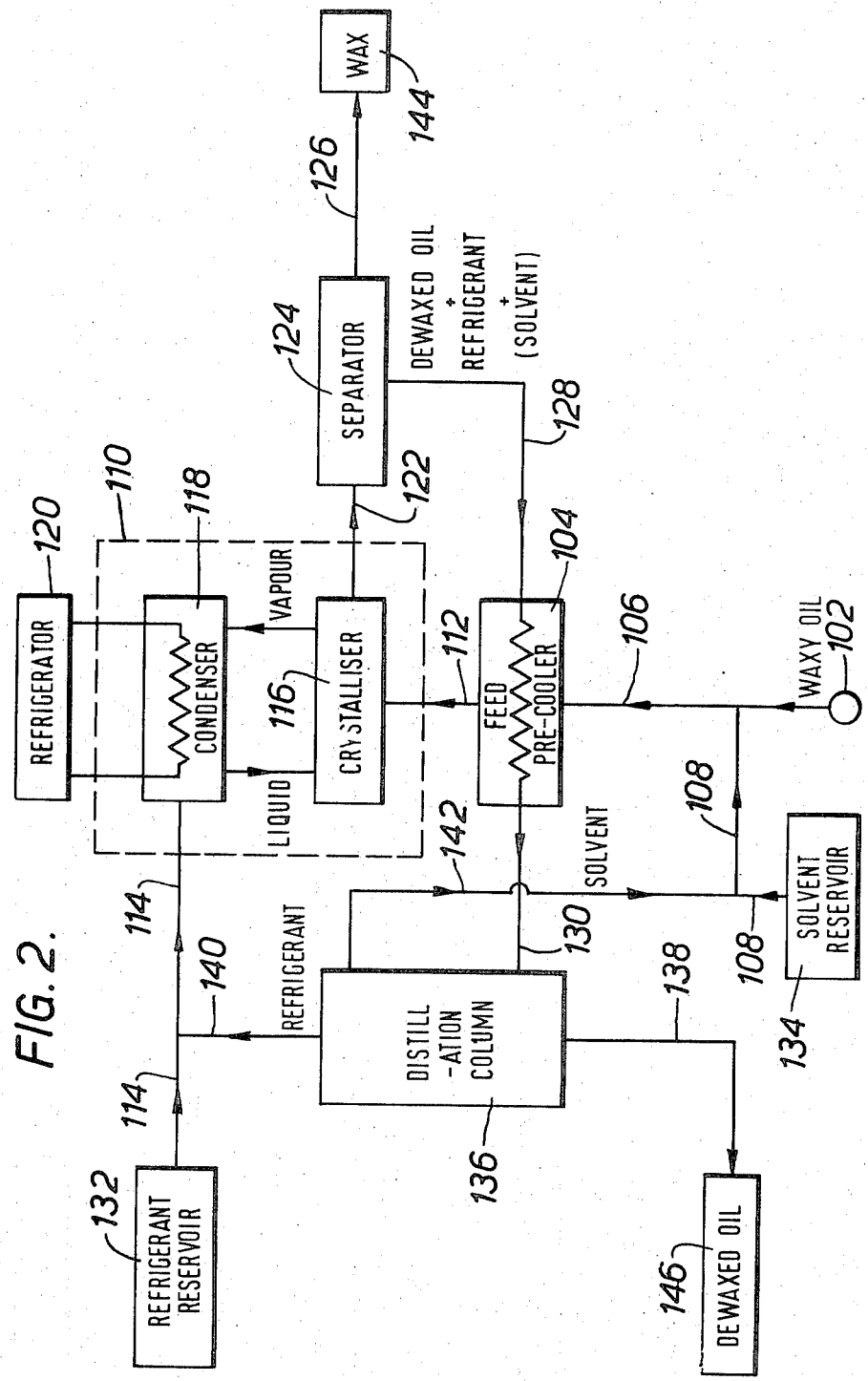
FIG. 2 is a block diagram of another apparatus embodying the invention.

The apparatus and method to be described in conjunction with FIG. 2 are for dewaxing lubricating, fuel or crude oils.

In FIG. 2, oil (crude or lubricating) to be dewaxed is fed into the apparatus through a port 102 along a pipe 106 to a heat exchanger in the form of a feed pre-cooler 104. A viscosity reducing solvent which is a poor solvent for wax, methyl ethyl ketone or toluene, or a mixture of both, for example is mixed with the oil through a pipe 108 which feeds the solvent from a solvent reservoir 134 to the pipe 106.

The mixture of oil and solvent is then fed from the pre-cooler 104 to a refrigeration plant 110 for example similar to that described in conjunction with FIG. 1 via a pipe 112. The refrigeration plant 110 is fed with a direct contact refrigerant from a refrigerant reservoir 132 through a pipe 114. In the lower regions of the plant 110 there is provided a crystalizer 116 while in the upper regions there is a condenser 118 of a conventional refrigerator 120. A pipe 122 feeds a slurry of crystallised wax, dewaxed oil, refrigerant and solvent from the crystallizer to a separator 124 which separates the wax from the separator through a pipe 126 while the remaining liquids are fed through a pipe 128 to the heat exchanger of the pre-cooler 104. The liquids are then fed via a pipe 130 to a distillation column 136 where dewaxed oil, solvent and refrigerant are separated. The dewaxed oil is discharged from a pipe 138, the refrigerant is discharged through a pipe 140 into the pipe 114 and the solvent is discharged through a pipe 142 into the pipe 108.

In operation, waxy (crude or lubricating) oil is fed into the port 102, mixed with viscosity reducing solvent from the pipe 108 and pre-cooled in the cooler 104. The pre-cooled mixture is fed to the crystallizer 116 in the plant 110 where it is mixed with the refrigerant. The refrigerant is such as to be miscible with the oil and solvent, and as the refrigerant continuously evaporates from the mixture of oil, solvent and refrigerant the vapor impinges upon the condensor 118 and is returned in liquid form to the crystallizer 116. The evaporation of the refrigerant chills the oil in the crystallizer and promotes crystallization of the wax. The crystallized wax together with the solvent, oil and refrigerant in the form of a slurry are drawn off from the crystallizer 116 through the pipe 122. The wax is separated from the surry in the separator 124, by means of a centrifuge or a filter and discharged via the pipe 126. The cool dewaxed oil, refrigerant and solvent are then circulated through the cooling coil of the pre-cooler 104 so as to acquire heat from, and thus to cool, the incoming waxy oil-solvent mixture. The heated liquids are then separated by fractional distillation in the distillation column 136. The separated refrigerant and solvent are then recirculated through the system and any losses of solvent or refrigerant are made good from the refrigerant and solvent reservoirs 132 and 134.

It will be appreciated that the step of adding the viscosity reducing solvent to the oil may bbe omitted where the viscosity of the particular oil to be dewaxed allows.

The solubility of the refrigerant in the oil is preferably less than 10% by volume in order to avoid an excessive depression in the freezing point of the oil/refrigerant mixture.

Examples of suitable refrigerants are low boiling point hydro-carbons, such as ethane, and ethylene, and halogenated hydro-carbons of the Freon series. The selection of the refrigerant will largely be determined by the required operating temperature of the crystallizer.

The liquefaction temperature of the refrigerant at a predetermined pressure is at least as low as the temperature at which the wax crystallize from the mixture at that pressure. If it is desired to operate the crystallizer at a temperature of 0°C, a preferred refrigerant is dichloro-difluoro-methane; if it is desired to operate the crystallizer at a temperature of −20°C, a preferred refrigerant is chlorodifluoromethane and if it is desired to operate the crystallizer at a temperature of −40°C, a preferred refrigerant is chlorotrifluormethane.

Advantageously the pressure in the refrigeration plant lies in the range of 1 to 5 atmospheres.

Instead of the condenser 118 being cooled by a conventional refrigerator it can take the form of a heat exchanger supplied with liquefied natural gas when the latter is readily available to provide a cheap source of refrigeration. In this particular case the refrigerant supplied to the crystalizer is advantageously ethylene, a cheap and usually readily available refrigerant.

The process described is advantageous in reducing the "pour point" of both crude and lubricating oils in order to prevent the oil solidifying in pipe lines and tanks during subsequent transportation.

I claim:

1. A method of separating a component compound from a feed-stock by crystalliation of the component compound from the feed-stock, comprising the steps of
mixing the feed-stock with a refrigerant having a solubility of less than 10% by volume in the feed-stock and at such a temperature as to allow the refrigerant to evaporate from the mixture so as to cause cooling of the feed-stock,
directing the evaporated refrigerant to a condenser to liquefy the refrigerant, liquefaction of the refrigerant gas being effected entirely by said condenser, and returning the condensed refrigerant by gravity to the feed-stock to cause the feed-stock to cool to that temperature at which crystallization of the compound occurs.

2. A method according to claim 1, including the steps of removing the crystallized component compound from the mixture of feed-stock and refrigerant, and adding fresh feed-stock and refrigerant to the mixture after the step of removing the crystallised component compound.

3. A method according to claim 1 wherein the feed-stock comprises a mixture of para-xylene and meta-xylene in which the component compound is para-xylene.

4. A method according to claim 1, wherein the feed-stock comprises a waxy oil and the component compound comprises wax.

5. A method according to claim 1, wherein the feed-stock comprises a mixture of unsaturated and saturated fatty acids and the component compound comprises the saturated fatty acids.

6. A method according to claim 1, wherein the feed-stock comprises a mixture of acetic acid and acetic anhydride and the component compound comprises acetic acid.

7. A method according to claim 1, wherein the refrigerant comprises a fluorinated hydrocarbon refrigerant.

8. A continuous oil dewaxing process, comprising the steps of
mixing oil with a refrigerant having a solubility of less than 10% by volume in the oil,
allowing the refrigerant to evaporate to chill the mixture sufficiently to induce crystallization of the wax in the oil,
condensing the evaporated refrigerant by applying it to a condenser, liquefaction of the refrigerant gas being effected entirely by said condenser, and returning the condensed refrigerant by gravity to the mixture,
separating the crystallized wax from the mixture, and processing the remainder of the mixture to separate the dewaxed oil and the refrigerant.

9. A process according to claim 8 including the step of using the chilled mixture after the step of wax removing, to pre-cool the undewaxed oil before the step of adding the refrigerant to the oil.

10. A process according to claim 8 including the step of condensing the evaporated refrigerant is performed by means of liquefied natural gas.

11. A method according to claim 8 wherein the step mixing the oil with the refrigerant includes the step of also adding to the oil a viscosity reducing solvent which is a poor solvent for wax.

* * * * *